US012691887B2

(12) United States Patent
Nichols et al.

(10) Patent No.: US 12,691,887 B2
(45) Date of Patent: Jul. 28, 2026

(54) SYSTEM AND METHOD FOR PROVIDING A DYNAMIC USER EXPERIENCE IN A VEHICLE CARE

(71) Applicant: Quick Quack Car Wash Holdings, LLC, Roseville, CA (US)

(72) Inventors: Joseph Matthew Nichols, Rocklin, CA (US); Christopher Clinton Chappell, Lincoln, CA (US); McNamara Marlow Pope, III, Fair Oaks, CA (US); Rodney Daniel Sparks, Antelope, CA (US); Joseph Allen Steele, III, Plumas Lake, CA (US); Josh David Schumacher, Sacramento, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/196,494

(22) Filed: May 12, 2023

(65) Prior Publication Data

US 2024/0375663 A1     Nov. 14, 2024

(51) Int. Cl.
B60W 40/08        (2012.01)
B60W 50/14        (2020.01)

(52) U.S. Cl.
CPC ............ B60W 40/08 (2013.01); B60W 50/14 (2013.01); *B60W 2050/146* (2013.01); *B60W 2540/215* (2020.02)

(58) Field of Classification Search
CPC .............................. B60W 40/08; B60W 50/14
See application file for complete search history.

(56) References Cited

U.S. PATENT DOCUMENTS

| | | | | |
|---|---|---|---|---|
| 11,443,260 | B1 * | 9/2022 | van Breen | G08G 1/095 |
| 11,954,656 | B1 * | 4/2024 | Garner, IV | G07G 1/00 |
| 2010/0010822 | A1 * | 1/2010 | Bal | G06Q 30/02 |
| | | | | 705/1.1 |
| 2015/0089623 | A1 * | 3/2015 | Sondhi | H04L 63/205 |
| | | | | 726/9 |
| 2017/0026379 | A1 * | 1/2017 | Lu | H04L 63/102 |
| 2017/0330145 | A1 * | 11/2017 | Studnicka | G07C 9/00896 |
| 2018/0202686 | A1 * | 7/2018 | Ahuja | F24F 11/62 |
| 2019/0026697 | A1 * | 1/2019 | Burton | G06F 8/71 |
| 2019/0253250 | A1 * | 8/2019 | Bruner | G06F 21/445 |

(Continued)

FOREIGN PATENT DOCUMENTS

| | | |
|---|---|---|
| CN | 115392514 A | 11/2022 |
| WO | 2020/151185 A1 | 7/2020 |

*Primary Examiner* — Jess Whittington
(74) *Attorney, Agent, or Firm* — Caldwell LLC

(57)        ABSTRACT

A system for providing a dynamic user experience in a vehicle care, the system includes a plurality of vehicle care devices, a control module configured to operate the plurality of vehicle care devices, wherein the control module includes a processor and a memory containing instructions configuring the processor to accept a user profile comprising a vehicle profile pertaining to a user from a user device, generate a token as a function of the user profile, create a visual interface as a function of the user profile, determining at least a vehicle care command as a function of the user profile, wherein determining at least a vehicle care command includes validating the token as a function of the user profile, and transmitting the at least a vehicle care command to the plurality of vehicle care devices.

22 Claims, 8 Drawing Sheets

(56)                    References Cited

U.S. PATENT DOCUMENTS

| | | | | |
|---|---|---|---|---|
| 2019/0357049 A1* | 11/2019 | Tali | ...................... | H04W 12/64 |
| 2020/0007322 A1* | 1/2020 | Weldemariam | ..... | G06F 16/1805 |
| 2020/0031248 A1* | 1/2020 | Kwak | .................... | B60L 53/16 |
| 2020/0226584 A1* | 7/2020 | Nawoj | ................ | G06Q 20/127 |
| 2021/0004912 A1* | 1/2021 | Stark | .................... | G06V 30/224 |
| 2021/0056184 A1* | 2/2021 | Modani | .................. | G06F 21/44 |
| 2021/0192652 A1* | 6/2021 | Blaikie, III | ........... | G06Q 50/18 |
| 2023/0010339 A1* | 1/2023 | Lamacchia | .......... | H04L 9/3247 |
| 2023/0256943 A1* | 8/2023 | Malki | ............... | G05B 19/4155 |
| | | | | 700/225 |
| 2024/0400203 A1* | 12/2024 | Gregorovic | ............. | G06N 3/08 |

* cited by examiner

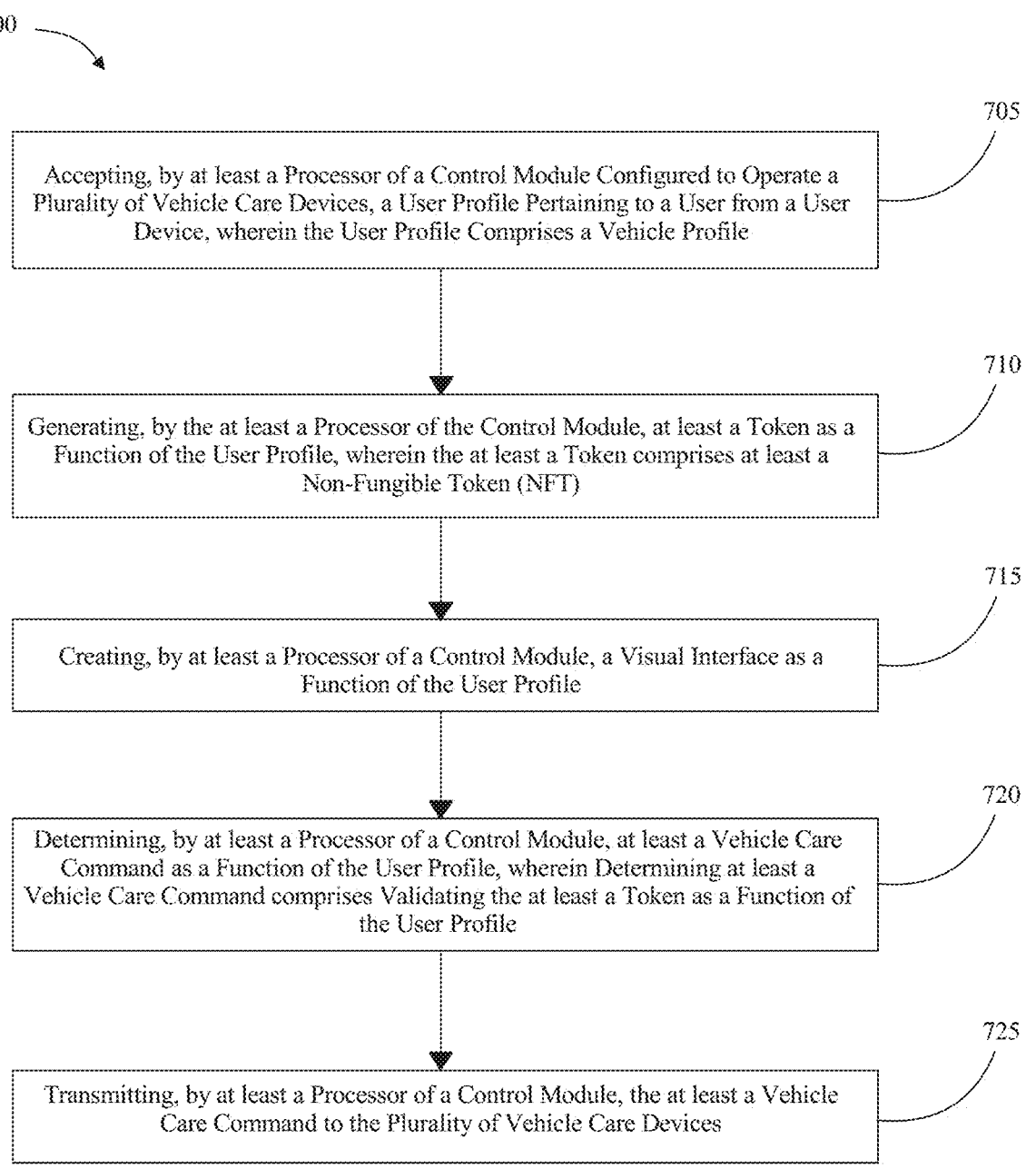

700

705
Accepting, by at least a Processor of a Control Module Configured to Operate a Plurality of Vehicle Care Devices, a User Profile Pertaining to a User from a User Device, wherein the User Profile Comprises a Vehicle Profile 710
Generating, by the at least a Processor of the Control Module, at least a Token as a Function of the User Profile, wherein the at least a Token comprises at least a Non-Fungible Token (NFT)

715
Creating, by at least a Processor of a Control Module, a Visual Interface as a Function of the User Profile 720
Determining, by at least a Processor of a Control Module, at least a Vehicle Care Command as a Function of the User Profile, wherein Determining at least a Vehicle Care Command comprises Validating the at least a Token as a Function of the User Profile 725
Transmitting, by at least a Processor of a Control Module, the at least a Vehicle Care Command to the Plurality of Vehicle Care Devices

*FIG. 7*

SYSTEM AND METHOD FOR PROVIDING A DYNAMIC USER EXPERIENCE IN A VEHICLE CARE

FIELD OF THE INVENTION

The present invention generally relates to the field of vehicle care apparatuses. In particular, the present invention is directed to system and method for providing a dynamic user experience in a vehicle care.

BACKGROUND

In recent years, the vehicle care industry has seen a significant increase in demand for personalized and stream-lined experiences that cater to the specific needs and preferences of individual users. Traditional vehicle care services, such as car washes, vacuuming, and other maintenance tasks, have primarily operated on a one-size-fits-all basis, often failing to meet the unique requirements of each user and their respective vehicles. Vehicle care devices installed at the vehicle care site are also difficult to use and require manual activation.

SUMMARY OF THE DISCLOSURE

In an aspect, a system for providing a dynamic user experience in a vehicle care is described. The system includes a plurality of vehicle care devices, a control module configured to operate the plurality of vehicle care devices, wherein the control module includes at least a processor, and a memory communicatively connected to the at least a processor, wherein the memory containing instructions configuring the at least a processor to accept a user profile pertaining to a user from a user device, wherein the user profile includes a vehicle profile, generate at least a token as a function of the user profile, create a visual interface as a function of the user profile, determining at least a vehicle care command as a function of the user profile, wherein determining at least a vehicle care command includes validating the at least a token as a function of the user profile, and transmitting the at least a vehicle care command to the plurality of vehicle care devices.

In another aspect, a method for providing a dynamic user experience in a vehicle care is described. The method includes accepting, by at least a processor of a control module configured to operate a plurality of vehicle care devices, a user profile pertaining to a user from a user device, wherein the user profile includes a vehicle profile, generating, by the at least a processor of the control module, at least a token as a function of the user profile, creating, by the at least a processor of the control module, a visual interface as a function of the user profile, determining, by the at least a processor of the control module, at least a vehicle care command as a function of the user profile, wherein determining at least a vehicle care command includes validating the at least a token as a function of the user profile, and transmitting, by the at least a processor of the control module, the at least a vehicle care command to the plurality of vehicle care devices.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 7 is a flow diagram of an exemplary method for providing a dynamic user experience in a vehicle care.

Figure 1:
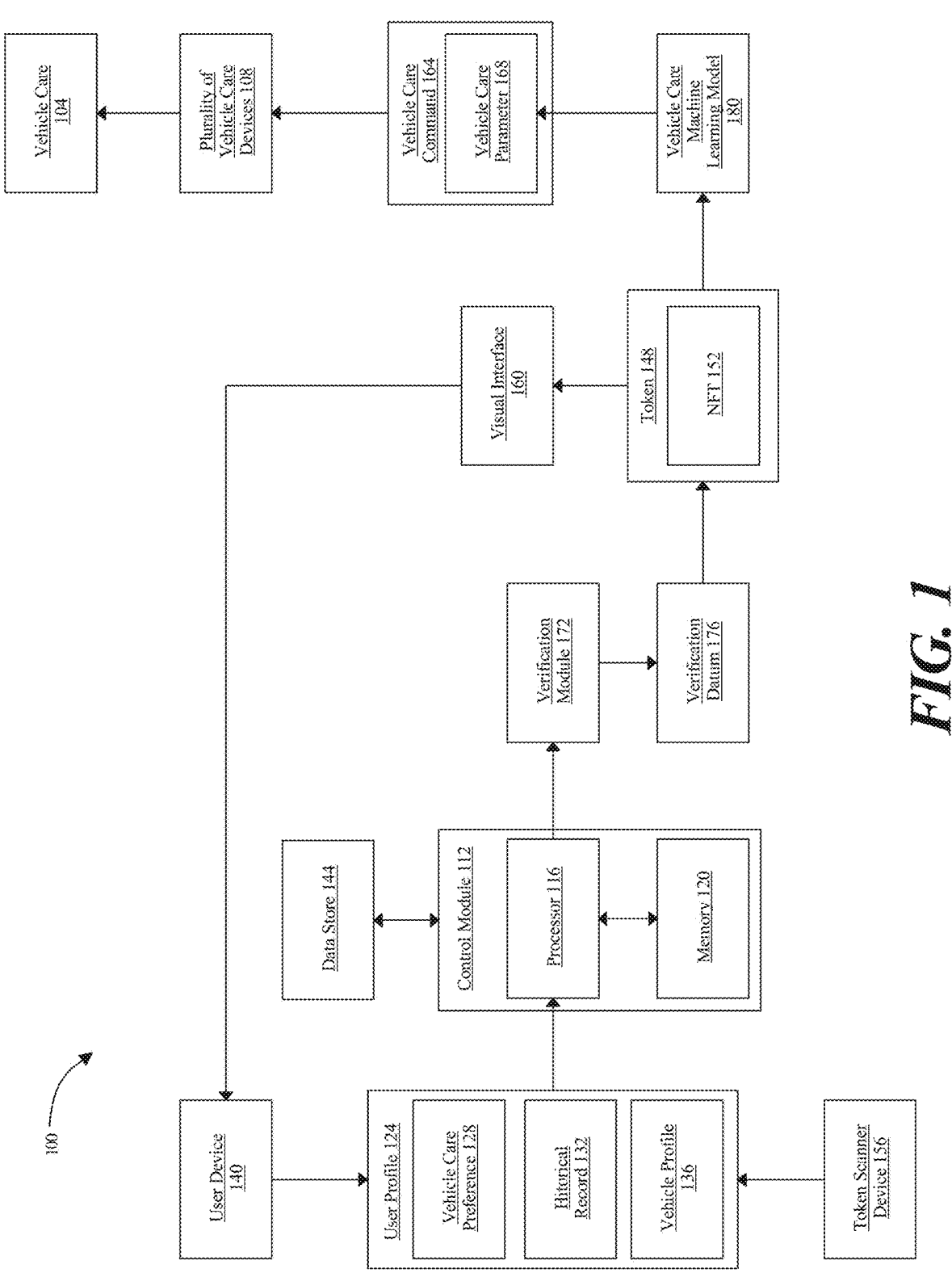
FIG. 1 is a diagram of an exemplary embodiment of an apparatus for providing a dynamic user experience in a vehicle care.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a system for providing a dynamic user experience in a vehicle care. In an embodiment, system includes a control module designed to operate a plurality of vehicle care devices configured to accept a user profile pertaining to a user from a user device, wherein the user profile includes a vehicle profile.

Aspects of the present disclosure allow for user credential verification and service activation. This is so, at least in part, because the control module is configured to generate at least a token as a function of the user profile, wherein the at least a token may include at least a Non-Fungible Token (NFT). Control module is also configured to create a visual interface as a function of the user profile, wherein the visual interface may be transmitted to the user device and configured to display the at least a token on the user device. In an embodiment, accepting user profile may include retrieving the user profile by scanning the at least a token via a token scanner device connected to the control module.

Aspects of the present disclosure can be used to determine a suitable vehicle care for the user's vehicle. Aspects of the present disclosure can also be used to determine an appropriate configuration for the vehicle care for the user's vehicle. This is so, at least in part, because control module may be configured to train a vehicle care machine learning model using vehicle care training data, wherein the vehicle care training data may include a plurality of user profiles as input correlated to a plurality of vehicle care parameters as output, determine at least one vehicle care parameter as a function of the user profile using the trained vehicle care machine learning model, and determine at least one vehicle care command as a function of the at least one vehicle care parameter. Control module may be configured to activating at least a vehicle care device of the plurality of vehicle care devices to perform at least a vehicle care as a function of the at least a vehicle care command. Exemplary embodiments illustrating aspects of the present disclosure are described below in the context of several specific examples.

In an embodiment, apparatus and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of a system 100 for providing a dynamic user experience in a vehicle care 104 is illustrated. As used in this disclosure, a "vehicle care" is any activity, service, or feature that may be offered at a vehicle service site or in association with any vehicle services. Vehicle may include, without limitation, car, truck, buses, motorcycles, boats, airplane, and the like. In a non-limiting example, vehicle service site may include a car wash site. Vehicle care 104 may include, without limitation, a car washing service, a car vacuuming service. Activity offered at vehicle service site may include purchasing snacks or vehicle related products, manually operating one or more devices installed at vehicle service site such as, without limitation, plurality of vehicle care devices as described in further detail below, accessing utilities at vehicle service site (e.g., restrooms or other compartments/areas), and the like. In another non-limiting example, vehicle care 104 may further include vehicle maintenance services such as, oil change, tire rotation, brake inspection, air filter replacement, battery service, cooling system flush, transmission service, timing belt replacement, spark plug replacement, and the like at a vehicle service site such as an independent auto repair shop.

With continued reference to FIG. 1, system 100 includes a plurality of vehicle care devices 108. As used in this disclosure, "vehicle care devices" are a broad category of equipment, tools, or otherwise machines used to perform vehicle care 104 as described above. In some cases, plurality of vehicle care devices 108 may be designed to help maintain the appearance, performance, and/or longevity of vehicles by addressing various aspects of vehicle care 104 such as exterior cleaning, interior cleaning, maintenance tasks, and the like. In a non-limiting embodiment, plurality of vehicle care devices 108 may include a car wash equipment, wherein the car wash equipment is a device that are specifically designed to clean the exterior of a vehicle; for instance, and without limitation, car wash equipment may include an automated car wash system, a pressure washers, a foam applicator, and/or the like. In another non-limiting embodiment, plurality of vehicle care devices 108 may include a vacuum machine, wherein the vacuum machine is an equipment used for cleaning the interior of a vehicle; for instance, and without limitation, vacuum machine may include a self-service vacuum machine, a commercial-grade vacuum cleaner designed for automotive use, and/or the like. In another non-limiting embodiment, plurality of vehicle care devices 108 may include a vending machine, wherein the vending machine is a machine that dispense various products; for instance, vending machine may be configured to dispense vehicle care products such as air fresheners, cleaning supplies, detailing tools, and the like. Such vending machine may allow users to conveniently purchase and apply these products to their vehicles. Other exemplary embodiments of vehicle care devices may include, without limitation, tire inflation device, fluid dispensing machine, diagnostic and maintenance tools (e.g., code readers, battery testers, tire pressure monitoring systems, etc.,) and the like.

With continued reference to FIG. 1, system 100 includes a control module 112. Control module 112 is configured to operate plurality of vehicle care devices 108. Control module includes at least a processor 116. Processor 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 116 may include a single computing device operating independently, or may include two or more computing device operating in concert, in parallel, sequentially or the like; two or more computing devices may be included together in a single computing device or in two or more computing devices. Processor 116 may interface or communicate with one or more additional devices as described below in further detail via a network interface device. Network interface device may be utilized for connecting processor 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 116 may include but is not limited to, for example, a computing device or cluster of computing devices in a first location and a second computing device or cluster of computing devices in a second location. Processor 116 may include one or more computing devices dedicated to data storage, security, distribution of traffic for load balancing, and the like. Processor 116 may distribute one or more computing tasks as described below across a plurality of computing devices of computing device, which may operate in parallel, in series, redundantly, or in any other manner used for distribution of tasks or memory between computing devices. Processor 116 may be implemented using a "shared nothing" architecture in which data is cached at the worker, in an embodiment, this may enable scalability of system 100 and/or computing device.

With continued reference to FIG. 1, processor 116 may be designed and/or configured to perform any method, method step, or sequence of method steps in any embodiment described in this disclosure, in any order and with any degree of repetition. For instance, processor 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 116 may perform determinations, classification, and/or analysis steps, methods, processes, or the like for the purposes of this disclosure using machine-learning processes. A "machine-learning process," as used in this disclosure, is a process that automatedly uses a body of data known as "training data" and/or a "training set" (described further below in this disclosure) to generate an algorithm that will be performed by a processor 116/control module 112 to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, control module 112 includes a memory 120 communicatively connected to the at least a processor 116. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a processor 116. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 116 is configured to accept a user profile 124 pertaining to a user from a user device 140. As used in this disclosure, a "user profile" is a digital representation of a user's information. A "user," for the purposes of this disclosure refers to any user that may be associated with vehicle care 104. User may include a consumer, an employee, an employer, a $3^{rd}$ party, a prospective consumer, a prospective employee, an agent working on behalf of the vehicle care 104, a government agent, an inspector, a prospective purchaser of a business, and the like. In an embodiment, user profile 124 may include user identifying information such as, without limitation, name, age, gender, occupation, address, and the like. In another embodiment, user profile 124 may include user's payment information such as, without limitation, a credit card number, a debit card number, a checking account number, and the like.

With continued reference to FIG. 1, in some cases, user profile 124 may include a vehicle care preference 128. As used in this disclosure, a "vehicle care preference" is information related to user's preferred vehicle care 104. In a non-limiting example, vehicle care preference 128 may include user specific cleaning methods, maintenance tasks, products, and the like. In an embodiment, vehicle care preference 128 may include information related to a customized car wash. In such embodiment, vehicle care preference 128 may include a lighting preference such as light show or other light display while a user vehicle is traveling through a car wash, a scent, a welcome screen or other presentation provided by control module 112 and/or plurality of vehicle care devices 108 to be used, a focus area for the car wash, an area of a vehicle to be ignored, a wash characteristic such as a brush RPM, a water temperature, an inclusion of soap or wax, an inclusion of a premium service such as detailing or a premium soap, extra cleaning for the tires, etc.) and the like.

With continued reference to FIG. 1, in some cases, user profile 124 may include a historical record 132. A "historical record," as used herein, is defined as a record of past vehicle care 104. In a non-limiting example, historical record 132 may include a previous vehicle care preference 128, vehicle care preferences 128 that a user selected for different vehicles, a change in vehicle care preference 128 over time, and the like. In another non-limiting example, historical record 132 may include a history of the user's past interactions with system 100/control module 112/processor 116, including vehicle care 104 user have selected and/or used, frequency of use, user feedback, and the like.

With continued reference to FIG. 1, user profile 124 includes a vehicle profile 136. As used in this disclosure, a "vehicle profile" is information referring to one or more vehicle of user that may be associated with a vehicle care 104. For example, and without limitation, vehicle profile 136 may include the make and model of a user's vehicle, wherein the make and model may signify the type of vehicle care 104 necessary to be properly performed on the vehicle. In some cases, vehicle profile 136 may include the license plate number of the vehicle. In some cases, vehicle profile 136 may further include the color of the vehicle, any additions to the interior or exterior of the vehicle (e.g., a roof rack, or a bike rack situated on the back of the vehicle). In some cases, vehicle profile 136 may include any damage to the vehicle and the location of the damage. Determination of any damage to a vehicle and the location thereof may allow for proper vehicle care 104 in damaged areas. In some cases, vehicle profile 136 may include dimensions of a vehicle, such as height, length, and width. In a non-limiting example, vehicle profile 136 may be consistent with any vehicle report disclosed in U.S. patent application Ser. No. 18/195,760, filed on May 10, 2023, entitled "APPARATUS AND METHOD OF VEHICLE PROFILING," which is incorporated by reference herein in its entirety.

Additionally, or alternatively, and still referring to FIG. 1, user profile 124 may include membership data. "Membership data," for the purposes of this disclosure, refers to relationship between the user and the vehicle care site. In a non-limiting example, vehicle care site may include a car wash. Membership data may include data that indicates the user is an employee of the car wash. In another non-limiting example, membership data may include data that a user is a paid consumer of the vehicle care 104 such as a car wash service. In some embodiments, membership data may further include data relating to a membership tier, wherein the "membership tier" is a specific level of membership associated with the user and the vehicle care site. In a non-limiting example, a membership tier of one may signify that user has a low membership status, and a tier of four may signify that user has a higher membership status. A different level of a membership tier may allow a user to have increased benefits (e.g., access to special vehicle care, discounts on vehicle care, reward points (or increased reward points) gained after a vehicle care, and the like.) at the car wash. In some cases, a differing membership tier may signify that status of the user. In a non-limiting example, a membership tier of one may signify that a user is a consumer, whereas a membership tier of four may signify that a user is an employee and the like. Differing membership tiers may signify that a user may have access to differing amenities such as access to different facilities or different rooms. Further, membership data may be associated with payment information within user profile 136. In a non-limiting example, membership data may include a payment of a predefined payment amount charged on a monthly basis as a function of payment information, wherein the payment amount may be determined based on user's selection of a membership tier.

With further reference to FIG. 1, user profile 124 may include audio data, text, images, audio-visual data, and the like. In some cases, user profile 124 may include image data. "User image data" for the purposes of this disclosure is data containing a photographic image or a set of photographic images of user. User image data may include an image of a user's driver's license or a similar identification card containing a photographic image of a user. In some cases, user image data may further contain a recently taken photograph of user, particularly the face of a user. In a non-limiting example, user image data may include a user avatar, wherein the user avatar is a graphical representation or image that represents a user in a digital or online context. Image data may be received through user input such as, with the use of an input device such as a camera.

With continued reference to FIG. 1, user profile 124 may be received from a user device 140. A "user device," for the purpose of this disclosure, is any additional computing device used by user to access and/or interact with digital content or services, such as a mobile device, laptop, desktop computer, or the like. In a non-limiting embodiment, user device 140 may be a computer and/or smart phone operated by a user in a remote location. User device 140 may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 140 may include a graphical user interface (GUI) configured to display any information from system 100 such as, without limitation, visual interface as described in further detail below. User device 140 may further include any device that is capable of transmitting information either wirelessly or through wired communication to another device such as control module 112. In a non-limiting example, user profile 124 may be input into user device 140 by a user, wherein the user may include a new customer of vehicle care site. In instances where user profile 124 is input into a user input device, user device 140 may transmit user profile 124 across a wireless connection. In some embodiments, wireless connection may be any suitable connection (e. g., radio, cellular).

With continued reference to FIG. 1, user device 140 and/or system 100 may include an input device such as a microphone, wherein input device and/or microphone is configured to receive at least audio data. As used in this disclosure, a "microphone" is any transducer configured to transduce pressure change phenomenon to a signal, for instance a signal representative of a parameter associated with the phenomenon. Microphone, according to some embodiments, may include a transducer configured to convert sound into electrical signal. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). Microphone may include any microphone for transducing pressure changes, as described above; therefore, microphone may include any variety of microphone, including any of condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone.

With continued reference to FIG. 1, an "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively, or additionally, audio signal may include a digital signal of time-varying digital numbers. In some cases, a digital audio signal may be communicated (e.g., transmitted and/or received) by way of any of an optical fiber, at least an electrically transmissive path, and the like. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may be single-ended or balanced.

Still referring to FIG. 1, in some embodiments, user device 140 and/or system 100 may include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

With continued reference to FIG. 1, in some instances, user profile 124 may be stored in a data store 144. It should be noted that data store 144 may be accessed by any computing device such as, without limitation, user device, control module 112, processor 116, and the like, using authorization credentials associated with user (or user profile 124). In some instances, user profile 124 may be created and stored via user device 140 and accessed via processor 116 of control module 112, using authorization credentials. In an embodiment, data store 144 may include a database. In some embodiments, a "data store" may be referred to as a "database." Data store 144 may be implemented, without limitation, as a relational database, a key-value retrieval database such as a NOSQL database, or any other format or structure for use as a database that a person skilled in the art would recognize as suitable upon review of the entirety of this disclosure. Data store 144 may alternatively or additionally be implemented using a distributed data storage protocol and/or data structure, such as a distributed hash table or the like. Data store 144 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

With continued reference to FIG. 1, generate at least a token 148 as a function of user profile 124. As used in this disclosure, a "token" is a unique identifier that represents the user's access, authorization, or otherwise entitlement to vehicle care 104 within system 100. In some cases, at least a token 148 may be a digital asset associated with the user. In a non-limiting example, at least a token 148 may include a Unique User Identifier. "Unique User Identifier" or "UID,"

for the purposes of this disclosure, is a numeric or alpha-numeric string that is associated with user. UID may be generated using user profile 124; for instance, without limitation, by hashing user related information within user profile 124 via one or more hashing algorithms as described above. In some cases, user profile 124 may contain UID, wherein the UID may be used to lookup the information of a user (i.e., retrieve user profile 124) on data store 144 as described above.

With continued reference to FIG. 1, in some cases, at least a token 148 may include a QR code associated with user. Generating at least a token 148 may include generating a QR code associated with user as a function of user profile 124. "QR code" or "Quick Response Code," for the purposes of this disclosure, is a two-dimensional barcode capable of containing data. A "barcode," for the purposes of this disclosure, is a machine-readable code in which processor 116 may receive and convert into numbers, alphanumeric strings and the like. In a non-limiting example, QR code may consist of black and white squares arranged in a specific pattern, wherein user profile 124 may be encoded as a form such as, without limitation, website URL, text message, image, or the like. In some cases, QR code may be generated using a QR code generator and/or software. A QR code generator may receive data such as user related information within user profile 124 and output a QR code that is associated with such data.

With continued reference to FIG. 1, in some cases, at least a token 148 may include a radio frequency identification (RFID). As used in this disclosure, "radio frequency iden-tification" is a user identification which uses radio waves to wirelessly identify and track users. In an embodiment, generating at least a token 148 may include enabling a Near Field Communication (NFC) setting on user device 140 as a function of the user profile 124. As used in this disclosure, a "Near Field Communication (NFC) setting," is a configu-ration of the status of NFC on user device 140. "NFC," as described herein, is a technology that allows NFC setting enabled device to execute a plurality of communication protocols, thereby enabling a communication between NFC setting enabled device and an external device such as, without limitation, control module 112, over a distance of 4 cm (1.5 inches) or less. NFC may offer a low-speed con-nection used to bootstrap one or more wireless connection similar to proximity card technology; for instance, and without limitation, user device 140 with NFC setting enabled may function as a smart card.

With continued reference to FIG. 1, in some cases, at least a token 148 may include at least a Non-Fungible Token (NFT) 152. As used in this disclosure, a "Non-Fungible Token" is a unique and non-interchangeable unit of data stored on an immutable sequence listing representing own-ership of an asset and/or a financial interest. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement a ledger, where data entries that have been posted to the immutable sequential listing cannot be altered. An immutable sequen-tial listing may include a directed acyclic graph. As used in this disclosure, a "ledger" is a digital immutable ledger where data entries may be posted and cannot be altered. Ledger may be distributed across some or all nodes on network, such as a peer-to-peer network, whereby each node replicates and saves an identical copy of ledger and updates itself independently. A common example of an immutable sequential listing is a blockchain. In a non-limiting example, at least a token 148 may include a representation of a digital wallet associated with user, wherein the digital wallet may include a plurality of NFTs, wherein plurality of NFTs may prove ownership of an asset and/or financial interest. Pro-cessor 116 may be configured to record at least a token 148 in immutable sequence listing and/or ledger. At least an NFT 152 may be consistent with any NFT disclosed in U.S. patent application Ser. No. 18/196,205, filed on May 11, 2023, entitled "SYSTEM AND METHOD FOR PROVIDING A SEAMLESS VEHICLE CARE AT A VEHICLE CARE SITE," which is incorporated by reference herein in its entirety.

Still referring to FIG. 1, immutable sequential listing may include multiple immutable sequential listings. Immutable sequential listing may include shared and synchronized digital data which may be spread across multiple sites. Immutable sequential listing may be stored and/or imple-mented on two or more nodes that may be connected by network, such as on a peer-to-peer network. Node may include a device such as processor 116, any remote device, or the like. Nodes may be connected by network and share information through ledger that is distributed. There may be no central administrator or centralized data storage of infor-mation and/or data located on immutable sequential listing. As information is entered onto and updated on ledger shared by nodes on network, each node may construct a new transaction. Nodes may then vote by a consensus algorithm as to which copy is correct. Consensus algorithms may include proof of work, proof of stake, or voting systems. Once a consensus has been determined, all other nodes may update themselves to reflect the new copy of ledger. In some embodiments, nodes may copy ledger in its entirety. In other embodiments, nodes may copy one or more portions of ledger. Nodes may be connected through a peer-to-peer networking whereby nodes are equally privileged and equi-potent participants. A peer-to-peer network may include a network of nodes that may make a portion of their resources available to other network participants. This may include resources such as processing power, disk storage or network bandwidth. Nodes located on a peer-to-peer network may both supply and consume resources. System 100 may utilize cryptographic keys and digital signatures to ensure node security and/or authenticity. System 100 may utilize digi-tally signed assertions as described in more detail below in reference to FIG. 2.

With continued reference to FIG. 1, generating at least a token 148 may include generating at least an NFT 152. Generating at least an NFT 152 may include minting at least an NFT 152. "Minting" for the purposes of this disclosure is the process in of publishing at least an NFT 152 onto a blockchain. In some cases, at least an NFT 152 may contain a reference to a digital address to user profile 124. In a non-limiting example, at least an NFT 152 may locate user profile 124 on a network. At least an NFT 152 may contain a uniform resource identifier ("URI"), wherein the URI is configured to point the address of user profile. In some cases, user profile 124 may be uploaded to an interplanetary file system (IPFS) wherein user profile may be immutable. User profile 124 uploaded onto IPFS may contain a unique hash associated with user profile 124 wherein at least an NFT 152 may direct to the unique hash. In some cases, at least an NFT 152 may provide for more secure access of user profile 124. In some cases, at least an NFT 152 may be used to certify ownership of user profile 124. In some cases, at least an NFT 152 may be used to protect user profile 124. In some cases, at least an NFT 152 may be used to prevent data accumulation by an entity. In a non-limiting example, user profile 124 may only be accessed through at least an NFT 152, wherein an entity may not be able to gather data related to a user unless the entity has control over at least an NFT 152. In some cases, at least an NFT 152 may provide immutable proof of membership (i.e., membership data as described above) to a vehicle care site. For example, and without limitation, at least an NFT 152 may provide immutable proof that an employee works at a car wash.

With continued reference to FIG. 1, in some embodiments, generation of at least an NFT 152 may prevent the copying or stealing of user profile 124 to access facilities and/or services within vehicle care site. In a non-limiting example, user may try to share user profile 124 in order to allow multiple individual to gain access to facility. Generation of at least an NFT 152 may prevent such sharing of user profiles 124. At least an NFT 152 may prevent unwarranted access of user profile 124. User profile 124 on at least an NFT 152 may prevent unwarranted access of user related data unless the owner of at least an NFT 152 allows access. Additionally, or alternatively, generating at least a token 148 may include linking a plurality of tokens. In a non-limiting example, generating at least a token 148 may include linking a first token such as, without limitation, a QR code to a second token such, without limitation, at least an NFT 152. Processor 116 may encode information related to at least an NFT 152 (e.g., NFT metadata) into QR code. For example, and without limitation, QR code may contain an address of at least an NFT 152. In such embodiment, QR code may be beneficial in instances wherein a user may seek to transmit address of at least an NFT 152 to control module 112. QR code linked to at least an NFT 152 may be processed by control module 112 in further processing steps as described below in this disclosure.

With continued reference to FIG. 1, in some embodiments, at least an NFT 152 may include a utility NFT. "Utility NFT," for the purposes of this disclosure, is an NFT capable of providing an owner of the NFT with special privileges. As opposed to a conventional NFT, in which the conventional NFT may be used to signify ownership of the NFT, utility NFT may further signify that a particular owner of an NFT is conferred privileges and/or permissions. In a non-limiting example, utility NFT may include one or more voucher or coupon tokens, wherein the voucher or coupon tokens are digital representations of vouchers or coupons that can be redeemed for discounts, free services, or other promotions within vehicle care site. In some cases, voucher or coupon tokens may be personalized based on user profile 124 (e.g., vehicle care preference 128, historical record 132, vehicle profile 136, and the like), ensuring offers provided by such voucher or coupon tokens are relevant and appealing to the user. In a non-limiting example, utility NFT may offer corresponding user a percentage-based (e.g., 20% off) or fixed-amount discount (e.g., $5 off) on certain vehicle care 104. In some cases, utility NFT may grant corresponding user access to a specific vehicle care 104 at no cost (e.g., a complimentary vacuum service or a free tire pressure check). In another non-limiting example, utility NFT may provide corresponding user with a package deal, wherein the package deal may combine multiple vehicle care services or products at a discounted rate. (e.g., a discounted bundle that includes a car wash, interior cleaning, and a tire shine service). Additionally, or alternatively, utility NFT may be earned by user as part of a loyalty program. In a non-limiting example, user may accumulate points or credits for each interaction with plurality of vehicle care devices 108. Once a certain threshold is reached, users may be able to redeem utility tokens for exclusive rewards or benefits, such as, without limitation, a free premium car wash or a discount on their next visit. Further, utility NFT may be distributed during specific time periods or events, such as holidays, anniversaries, or other special occasions. For example, and without limitation, user may receive a utility NFT for a discounted car wash during a seasonal promotion or a birthday-related incentive.

Still referring to FIG. 1, at least a token 148 may include an access token. As used in this disclosure, an "access token" is a digital credential that grants corresponding user temporary authorization to access specific resources, services, or features within vehicle care site. In some cases, access token may be generated and issued by control module 112 after a successfully user validation/verification as described in further detail below. In some cases, access token may be time-limited and may be revoked or refreshed as needed. Access token may protect sensitive resources and ensure that only authorized users can access the services or features they are entitled to. In a non-limiting example, user with a monthly or annual membership, indicated by membership data of user profile 124, may receive at least a token 148 containing an access token generated by processor 116, wherein the access token may grant user authorization to user specific services or features within vehicle care site; for instance, access a members-only car wash lane or receive priority service. In another non-limiting example, access token may include a temporary access token, wherein the temporary access token may grant corresponding user a one-time access to an exclusive feature (e.g., massage chair) within vehicle care site. In a further non-limiting example, access token may include an access level determined based on user profile 124. "Access level," for the purposes of this disclosure, refers to data containing a set of permissions or restrictions with respect to services offered at a vehicle care site and/or permissions or restrictions with respect to various areas within a vehicle care site. In a non-limiting example, at least an NFT 152 and access level may be consistent with any NFT and access level as described in U.S. patent application Ser. No. 18/196,205, filed on May 11, 2023, entitled "SYSTEM AND METHOD FOR PROVIDING A SEAMLESS VEHICLE CARE AT A VEHICLE CARE SITE," which is incorporated by reference herein in its entirety.

With continued reference to FIG. 1, generating at least an NFT 152 may include executing a smart contract. Processor 116 of control module 112 may be configured to generate and execute mart contract. As used in this disclosure, a "smart contract" is an executable program including rules that can process inputs which may trigger one or more actions that control module 112 automatically executes. Smart contract may be included in ledger as part of immutable sequence listing. Processor 116 in network may copy at least a portion of smart contract. In some embodiments, processor 116 copy smart contract in its entirety as part of ledger. Smart contract may include multiple smart contracts. Smart contract may involve at least an NFT 152. In a non-limiting example, smart contract may include a plurality of rules that grant permissions to a user within a vehicle care site. Smart contract may contain one or more rules to transfer at least an NFT 152 such as, without limitation, at least a utility NFT or a plurality of utility NFTs as described above to a user. Smart contract may be executed as a function of user profile 124 input wherein the input of user profile 124 into processor 116 may trigger smart contract to transfer one or more utility NFTs to a user. In some cases, smart contract may be executed as a function of access token of at least a token 148 as described above. In a non-limiting example, smart contract may contain rules wherein each access level may execute a differing rule. In some cases, smart contract may transfer ownership of utility NFT from a user after a user has ceased being a member at vehicle care site. For example, and without limitation, if an employee leaves their positions, smart contract may transfer partial or none of the utility NFTs associated with the employee to a new user, such that the user may have partial or no access and/or permissions at the vehicle care site. Similarly, smart contract may execute and transfer utility NFT from an account if a member has ceased payments.

With continued reference to FIG. 1, in some cases, at least a token 148 may allow for quicker transmission of user profile 124 to control module 112 and/or processor 116, wherein a token scanner device 156 may be used to easily access at least a token 148. As used in this disclosure, a "token scanner device" is a device designed to detect, read, and verify at least a token 148 such as, without limitation, UID, QR code, NFC, at least an NFT 152, and the like. Token scanner device 156 may be communicatively connected to processor 116 of control module 112. In a non-limiting example, token scanner device 156 may include a camera configured to detect and read at least a token 148 visually presented. Token scanner device 156 may scan a QR code associated with a user or a QR code linked to at least an NFT 152 and decode the QR code into user profile 124 pertaining to the user or at least an NFT 152 held by the user. Token scanner device 156 may be configured to transmit decoded data related to the user to processor 116. In such embodiment, QR code may provide for a more secure process of handling user profile 124 as QR code may not be easily copied in comparison to user profile 124 and or at least an NFT 152 containing explicit user related data.

Still referring to FIG. 1, token scanner device 156 may include an NFC reader. As used in this disclosure, an "NFC reader" is an external device configured to communicate with NFC enabled device such as user device 140 as described above. NFC reader may support a plurality of radio-frequency (RF) protocols such as, without limitation, Zigbee, Bluetooth Low Energy, Wi-Fi, and the like thereof. In some embodiments, NFC reader may initiate the communication; for instance, and without limitation, NFC reader may send one or more commands to user device 140 within a distance via magnetic field such as, without limitation, command to accept user profile 124, and/or any processing steps described below in this disclosure. In some embodiments, NFC reader may be capable of writing data into user device 140. In a non-limiting example, NFC reader may be used to write generated at least a token 148 to user device 140, thereby enabling NFC setting of user device 140. Additionally, or alternatively, token scanner device may be embedded within each vehicle care device of plurality of vehicle care devices 108. In a non-limiting example, vehicle care devices may be able to function properly once the NFC reader embedded in them successfully detect and read user profile 124 from user device 140 with NFC setting enabled. Further, NFC reader may be implemented using a web NFC application programming interface (API) such as, without limitation, NDEFReader interface, wherein the web NFC API is a low-level API that provides sites/apps the ability to read and write to user device 140.

With continued reference to FIG. 1, create a visual interface 160 as a function of the user profile 124. As used in this disclosure, a "visual interface" is a digital display that presents information, options, interactive elements to users in an intuitive and visually appealing manner. In some embodiments, visual interface 160 may include at least an interface element. As used in this disclosure, "at least an interface element" is a portion of visual interface 160. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like.

Still referring to FIG. 1, in some cases, event handler may include a cross-session state variable. As used herein, a "cross-session state variable" is a variable recording data entered on user device 140 during a previous session. Such data may include, for instance, previously entered text, previous selections of one or more elements as described above, or the like. For instance, and without limitation, cross-session state variable data may represent a search a user entered in a past session. Cross-session state variable may be saved using any suitable combination of client-side data storage on remote device and server-side data storage on processor 116. Data may be saved wholly or in part as a "cookie" which may include data or an identification of user device 140 to prompt provision of cross-session state variable by processor 116, which may store the data on processor 116. Alternatively, or additionally, control module 112 may use login credentials, device identifier, and/or device fingerprint data to retrieve cross-session state variable, which processor 116 of control module 112 may transmit to user device 140. Cross-session state variable may include at least a prior session datum. A "prior session datum" may include any element of data that may be stored in a cross-session state variable. Visual interface 160 may be further configured to display the at least a prior session datum, for instance and without limitation auto-populating user query data from previous sessions. In a non-limiting example, visual interface 160 may include user selected services, membership tier, offers, vehicle information, and/or the like. Advantageously, processor 116 may store previous selections such that a user does not have to select options each time the visit. In some instances, user may be prompted to make new selections if one or more of their saved selections is not available. Visual interface 160 may be consistent with any personalized user interface as described in U.S. patent application Ser. No. 18/196,174, filed on May 11, 2023, entitled "A METHOD AND AN APPARATUS FOR A PERSONALIZED USER INTERFACE," which is incorporated by reference herein in its entirety.

With continued reference to FIG. 1, creating visual interface 160 may include transmitting visual interface 160 to user device 140. In some cases, visual interface 160 may be configured to display user profile 124 on user device 140. In some cases, visual interface 160 may be configured to display at least a token 124 on user device 140. In a non-limiting example, visual interface 160 may include at least an interface element, for example, an image box, wherein the image box may be configured to host and display at least a token 148 generated by processor 116 as a function of user profile 124 such as, without limitation, a QR code. In some cases, event handler may transmit data from user device 140 to processor 116 or receive data from processor 116 to user device 140. In a non-limiting example, at least a token 148 may be hidden on visual interface 160. Visual interface 160 may further include an interface element for example, a button with an event handler configured to request at least a token 148 such as, without limitation, access token. Such event handler may be also configured to receive access token from processor 116. User may visually present access token to token scanner device 156 via visual interface 160 to access, services, or features within vehicle care site. In another non-limiting example, visual interface 160 may be configured to display at least an NFT 152 such as, without limitation, utility NFTs. User may redeem a voucher or a coupon at vehicle care site by presenting utility NFTs using user device 140 to token scanner device 156. An associated discount or promotion may be applied to the user's transaction, and utility NFTs may be marked as used or expired upon a successful verification of at least an NFT 152 by processor 116 as described in further detail below. In an embodiment, creation of visual interface 160 and configuration of displaying user profile 124 and/or at least a token 148 may streamlines the redemption process, reduces the potential for fraud, and enables the vehicle care site to track and analyze user behavior and preferences more effectively.

With continued reference to FIG. 1, processor 116 is configured to determine at least a vehicle care command 164 as a function of the user profile 124. As used in this disclosure, a "vehicle care command" is an instruction or signal that directs the operation of one or more vehicle care devices of plurality of vehicle care devices 108. In some cases, at least a vehicle care command 164 may include at least a vehicle care parameter 168. At least a "vehicle care parameter," for the purpose of this disclosure, refers to a specific setting or value associated with at least a vehicle care command 164 that influences the operation, performance, or outcome of a vehicle care device of plurality of vehicle care devices 108 or vehicle care 104. In a non-limiting example, at least a vehicle care parameter 168 may specify a particular vehicle care type such as, without limitation, car wash, interior cleaning, detailing, paint protection, window tinting, tire services, oil change, and the like. In another non-limiting example, at least a vehicle care parameter 168 may specify a particular vehicle care products such as, without limitation, car wash soap, microfiber towels, interior cleaning products, wax and polish, tire shine, class cleaner, air fresheners, scratch repair kits, and the like. In a further non-limiting example, at least a vehicle care parameter 168 may specify a particular vehicle care location (e.g., location of nearest vehicle care site, vehicle care site with highest customer review, and the like) for performing vehicle care 104. Other exemplary embodiment of vehicle care parameters 168 may include, without limitation, vehicle care duration (e.g., car wash duration, vacuum duration, etc.), operation settings (e.g., water temperature, water pressure, soap concentration, vacuum suction power, drying method, product dispensing, etc.), and the like.

Still referring to FIG. 1, in an embodiment, vehicle care command may include a car wash command, wherein the car wash command is a command that activates a specific car wash program, such as a basic wash, deluxe wash, or premium wash, based on the user's preferences and entitlements and vehicle profile 136. In another embodiment, vehicle care command may include a vacuum command, wherein the vacuum command is a command that activates a self-service vacuum machine for a designated period, allowing the user to clean the interior of their vehicle. In another embodiment, vehicle care command may include a vending machine command, wherein the vending machine command is a command that dispenses a specific product, such as a car air freshener or windshield wiper fluid, from a vehicle care device such as a vending machine, based on the user's selection or entitlements. In another embodiment, vehicle care command may include a device configuration command, wherein the device configuration command is a command that adjusts the settings or parameters of a vehicle care device, such as the water temperature or pressure in a car wash, to suit the user's preferences or the specific requirements of their vehicle. In a further embodiment, vehicle care command may include a facility access command, wherein the facility access command is a command that grants the user access to a restricted area within the vehicle care site, such as a members-only parking zone or a secure storage area for personal belongings.

With continued reference to FIG. 1, in some cases, determining at least a vehicle care command 164 includes validating at least a token 148 as a function of user profile 124. Validating at least a token 148 may include utilizing a verification module 172 configured to generate a verification datum 176 as a function of the user profile 124. As used in this disclosure, a "verification module" is a component responsible for validating and/or verifying a given credential, a certification, or otherwise an entitlement. A "verification datum," for the purpose of this disclosure, is a unique identifier or proof of authenticity that can be used to confirm user's identity, access rights, or entitlements within vehicle care site. Determining at least a vehicle care command 164 may include determining at least a vehicle care command 164 as a function of verification datum 176. In a non-limiting example, verification module 172 may be configured to validate user profile 124 is indeed associated with the correct user (e.g., matching user related information and vehicle profile, two-factor authentication, ID validation, payment validation, and the like). Verification module 172 may be configured to generate a verification datum as a function of the user profile validation, wherein processor 116 may restrict user from selecting vehicle care 104 (i.e., determining vehicle care command 164), if the verification datum indicates an unsuccessful user profile validation. Such restriction may be applied to the user until a verification datum indicating a successful user profile validation is generated by verification module 172 and recognized by processor 116.

With continued reference to FIG. 1, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, at least a token 148, against a specification. In some cases, processor 116 may be additionally configured to validate a product by validating constituent sub-products. In some embodiments, processor 116 may be configured to validate any product or data, for example without limitation, at least a token 148. In some cases, at least a machine-learning process, for example a machine-learning model, may be used to validate by processor 116. Processor 116 may use any machine-learning process described in this disclosure for this or any other function.

Still referring to FIG. 1, in an embodiment, validating at least a token 148 may include confirming at least a token 148 associated with the user is genuine, unexpired, and/or grants the appropriate access or entitlements. In a non-limiting example, validating at least a token 148 may include extracting relevant data from token via token scanner device 156 such as, without limitation, UID, user profile 124, vehicle profile 136, access level, token expiration time, and the like. In some cases, generating verification datum 176 may include matching data extracted from at least a token 148 to data stored in data store 144 and/or immutable sequential listing as described above. In other cases, generating verification datum 176 may include verifying a token authenticity by examining cryptographic elements such as, without limitation, digital signatures to ensure that at least a token 148 is issued by a trusted source and hasn't been tampered with. Additionally, or alternatively, validating at least a token 148 may further include associating verification datum 176 with user profile 124. Such association may ensure that verification datum 176 may be used later to validate user's identity, access rights, or entitlements. In some cases, verification datum 176 may be stored in data store 144. In a non-limiting example, when user attempts to access a specific service, feature, or resources within vehicle care site, verification module 172 may retrieve verification datum 176 stored in data store 144 and compare verification datum 176 to user profile 124 provided by the user. Further, verification datum 176 may be periodically updated, by verification module 172, to maintain its security and accuracy either in response to changes in user profile 124 or as a part of a routine security measure.

With further reference to FIG. 1, as used in this disclosure, "verification" is a process of ensuring that which is being "verified" complies with certain constraints, for example without limitation system requirements, regulations, and the like. In some cases, verification may include comparing a product, such as without limitation at least a token 148, against one or more acceptance criteria. For example, in some cases, at least a token 148 may be required to contain membership data. Ensuring that at least a token 148 is in compliance with acceptance criteria may, in some cases, constitute verification. In some cases, verification may include ensuring that data is complete, for example that all required data types are present, readable, uncorrupted, and/ or otherwise useful for processor 116. In some cases, some or all verification processes may be performed by processor 116. In some cases, at least a machine-learning process, for example a machine-learning model, may be used to verify. Processor 116 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

With continued reference to FIG. 1, in some cases, determining at least a vehicle care command 164 may include receiving at least a vehicle care command 164 from the user via visual interface 160. In a non-limiting example, visual interface 160 may include a plurality of interface elements, wherein each interface element may include a selection of vehicle care command 164. User may be able to input one or more vehicle care commands 164 by interacting with visual interface 160; for instance, and without limitation, user may select one or more vehicle care commands 164 displayed on visual interface. In some cases, determining at least a vehicle care command 164 may include determining at least a vehicle care parameter 168. Determining at least a vehicle care parameter 168 may include accepting a user input from user device 140. In a non-limiting example, user may be able to manually input a desired vehicle care type, vehicle care product, vehicle care location, and any other vehicle care parameters as described above to user device 140. User device 140 may be configured to transmit such user input to processor 116 of control module 112. Processor 116 may then determine at least a vehicle care command 164 as a function of the user input.

With continued reference to FIG. 1, in some cases, processor 116 may use a machine learning module, to implement one or more algorithms or generate one or more machine-learning models, such as vehicle care machine learning model 180, to determine at least a vehicle care command 164 and/or vehicle care parameter 168. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any databases as described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Vehicle Machine Learning Model 180 may be trained by correlated inputs and outputs of training data. Training data may be data sets that have already been converted from raw data whether manually, by machine, or any other method.

With continued reference to FIG. 1, determining at least a vehicle care command 164 as a function of user profile 124 may include receiving vehicle care training data. Vehicle care training data 144 may be stored in data store 144. Vehicle care training data may also be retrieved from data store 144. Vehicle care training data may include a plurality of user profiles correlated to a plurality of vehicle care parameters 168. In an embodiment, vehicle care training data may be used to indicate that a particular user profile 124 is correlated to a particular vehicle care parameter 168. In some cases, vehicle care training data may be received from a user, a third party, database, external computing devices, previous iterations of the function and/or the like. For the purposes of this disclosure, a "third party" is any person that is not a system user and/or external user that can provide feedback. This may include consumers who were recommended various vehicle care parameters in the past. Determining at least a vehicle care command 164 as a function of the user profile 124 may further include training a vehicle care machine learning model 180 as a function of the vehicle care training data and determining at least a vehicle care parameter 168 as a function of user profile 124 using the trained vehicle care machine learning model 180. At least a vehicle care command 164 may then be determined, by processor 116, based on determined vehicle care parameter 168.

With continued reference to FIG. 1, processor 116 is configured to transmit at least a vehicle care command 164 to plurality of vehicle care devices 108. Transmitting at least a vehicle care command 164 may also include transmitting one or more vehicle care parameters 168 associated with at least a vehicle care command 164. In some cases, vehicle care command 164 and/or vehicle care parameter 168 may be communicated by processor 116 of control module 112 to plurality of vehicle care devices 108 in form of one or more signals. As used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, system 100 may perform one or more signal processing steps on a signal. For instance, system 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, transmitting at least a vehicle care command 164 may include activating at least a vehicle care device of plurality of vehicle care devices 108 to perform at least a vehicle care 104 as a function of the at least a vehicle care command 164. In an embodiment, activating at least a vehicle care device of plurality of vehicle care devices 108 may include activating one or more necessary vehicle care devices within vehicle care site based on user's specific needs and (vehicle) preferences. In a non-limiting example, processor 116 may transmit vehicle care command 164 containing a preferred car wash program to a car wash equipment upon a successful token validation, thereby activating the preferred car wash program and initiating the car wash process. In another non-limiting example, user may scan at least a token 148 at a self-service vacuum machine via user device 140. Token scanner device 156 integrated within self-service vacuum machine may be configured to detect and read user related information from at least a token 148. Processor 116 may then validate detected user related information and transmit a vehicle care command 164 to self-service vacuum machine configuring self-service vacuum machine to active for a predetermined duration, thereby allowing the user to clean vehicle's interior.

Figure 2:
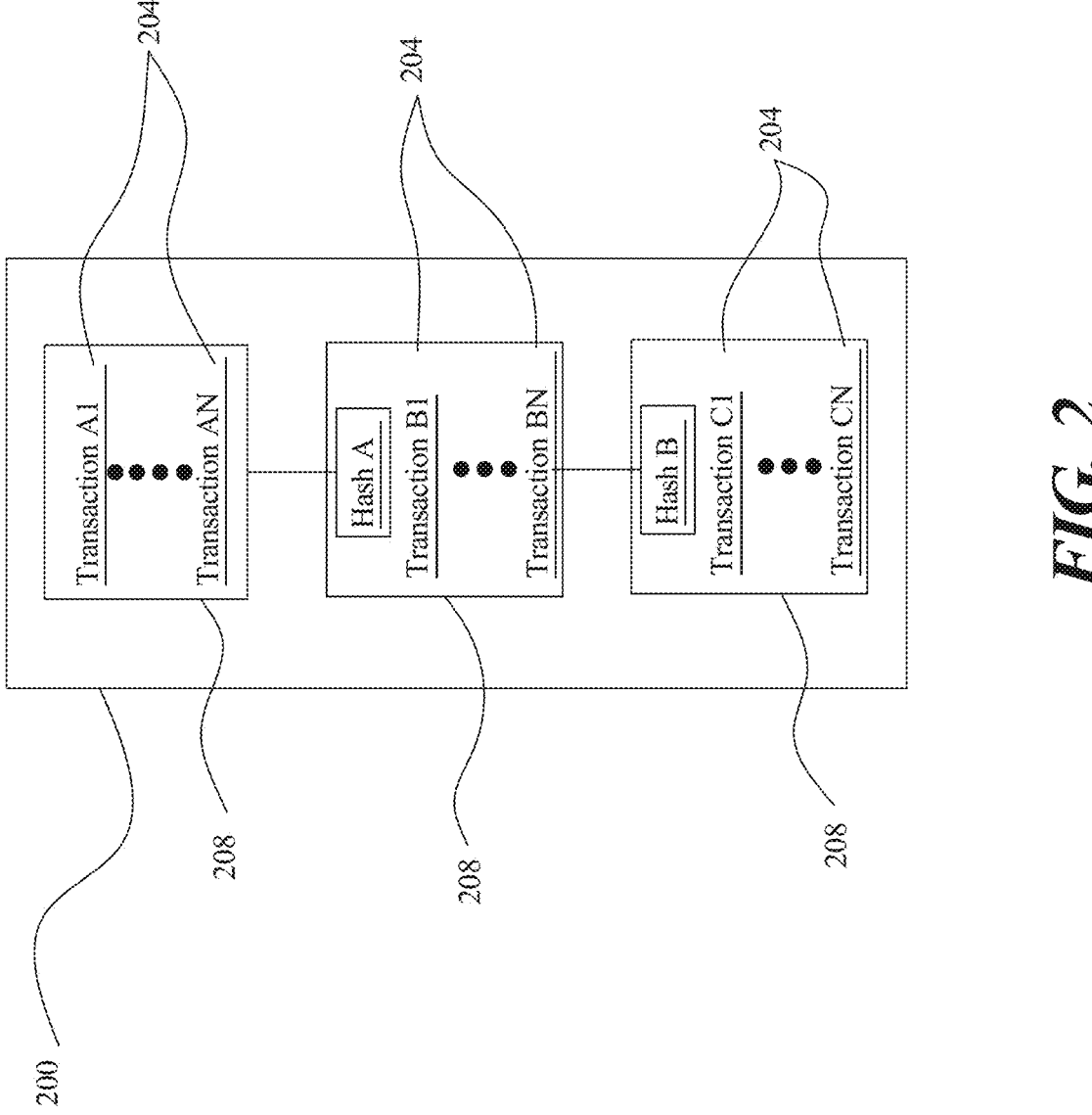
FIG. 2 is a block diagram of an exemplary immutable sequential listing.

Referring now to FIG. 2, an exemplary embodiment of an immutable sequential listing 200 is illustrated. Data elements are listed in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
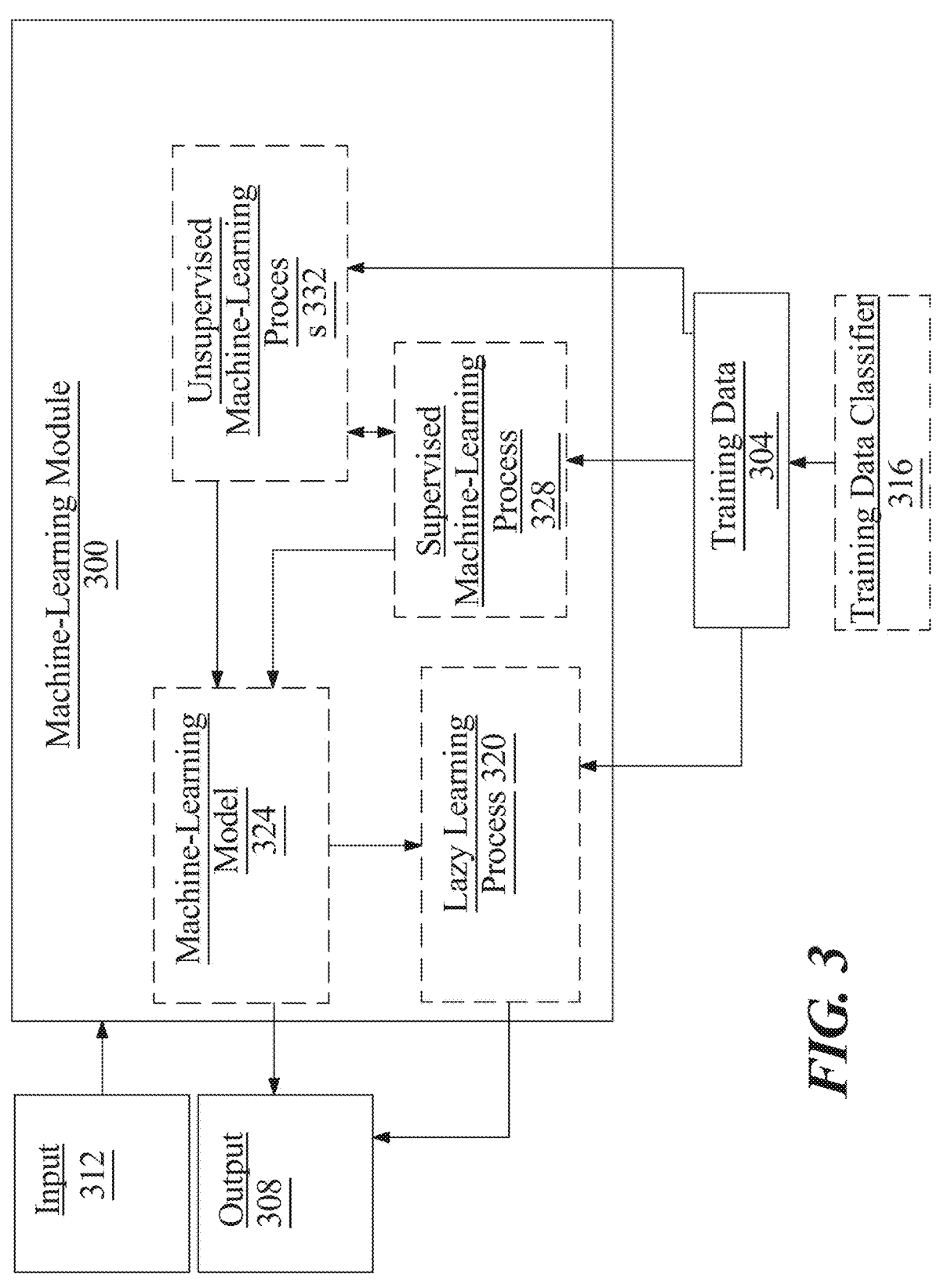
FIG. 3 is a block diagram of exemplary embodiment of a machine learning module.

Referring now to FIG. 3, an exemplary embodiment of a machine-learning module 300 that may perform one or more machine-learning processes, as described in this disclosure, is illustrated. Machine-learning module may perform determinations, classification, and/or analysis steps, methods, processes, or the like as described in this disclosure using machine learning processes. Machine-learning process may use training data 304 to generate an algorithm that will be performed by processor 104/module to produce outputs 308 given data provided as inputs 313; this is in contrast to a non-machine learning software program where the commands to be executed are determined in advance by a user and written in a programming language. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data elements may tend to correlate to a higher value of a second data element belonging to a second category of data elements, indicating a possible proportional or other mathematical relationship linking values belonging to the two categories. Multiple categories of data elements may be related in training data 304, according to various correlations; correlations may indicate causative and/or predictive links between categories of data elements, which may be modeled as relationships, such as mathematical relationships, by machine-learning processes, as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length format, formats linking positions of data to categories such as comma-separated value (CSV) formats and/or self-describing formats, such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user profile as described above as inputs, vehicle care command and/or vehicle care parameter as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Figure 4:
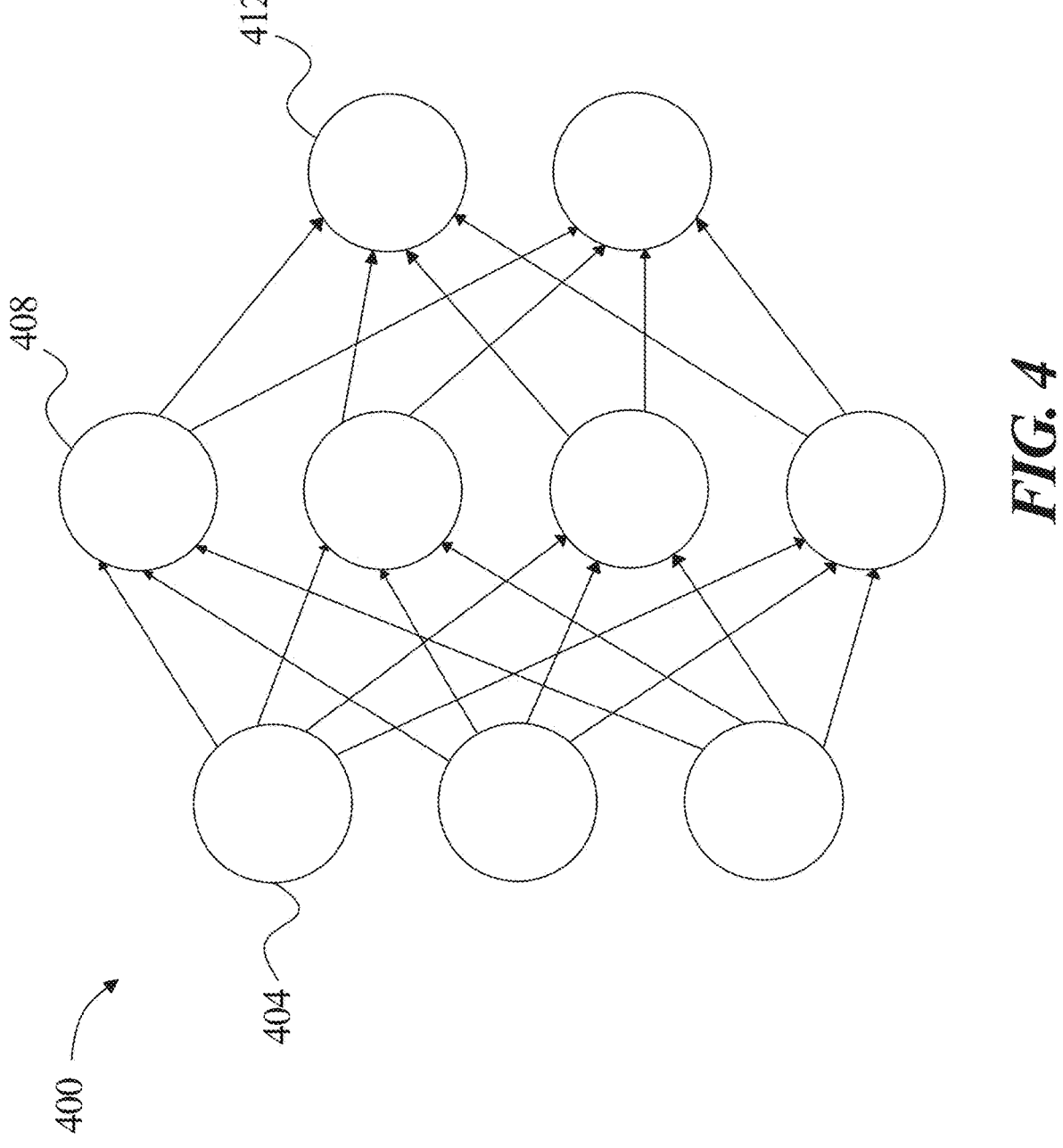
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
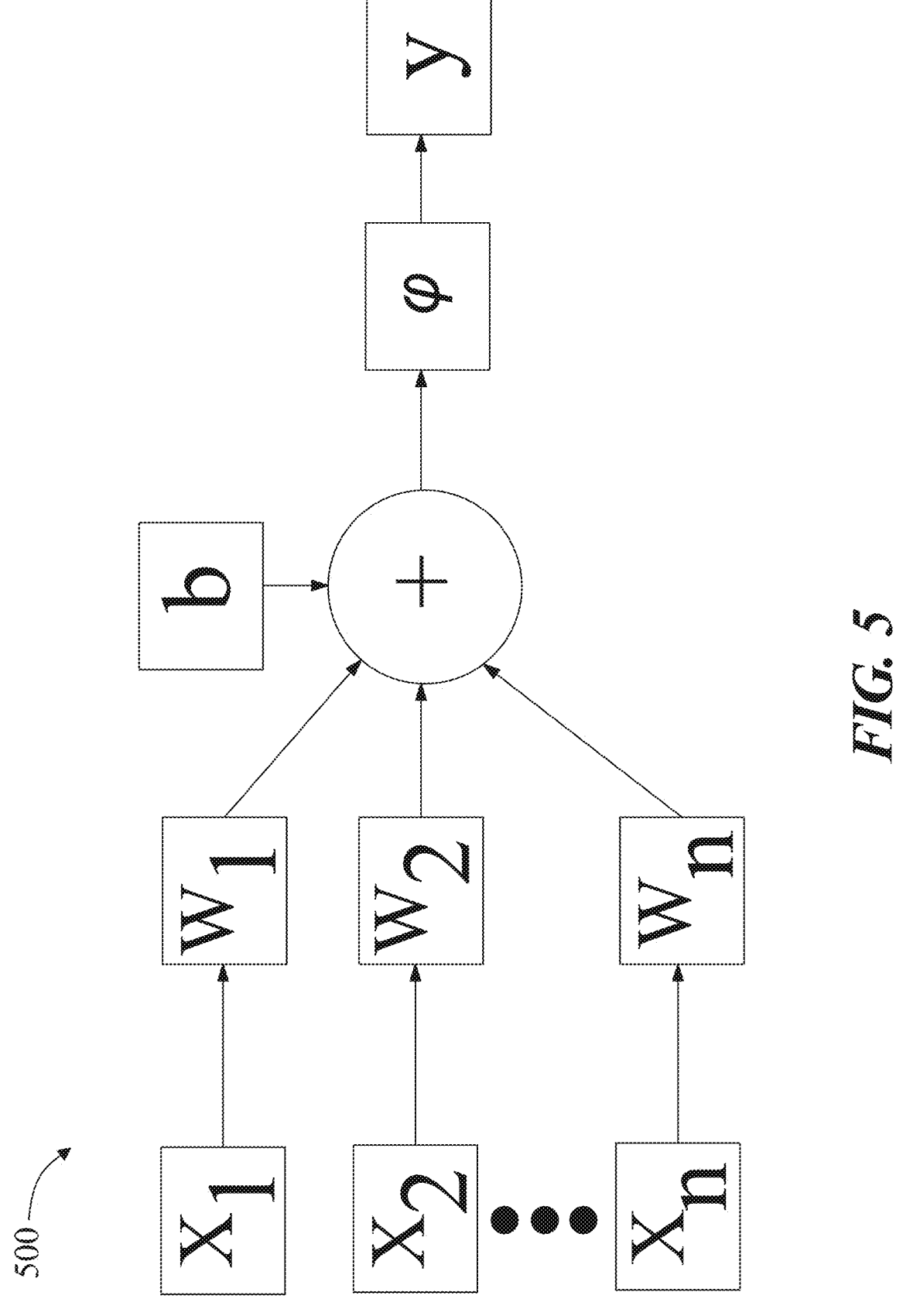
FIG. 5 is a block diagram of an exemplary embodiment of a node.

Referring now to FIG. 5, an exemplary embodiment of a node 500 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid } (x)$, a Gaussian error linear unit function such as $f(x) = a \ (1 + \tanh \ (\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0. \end{cases}$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
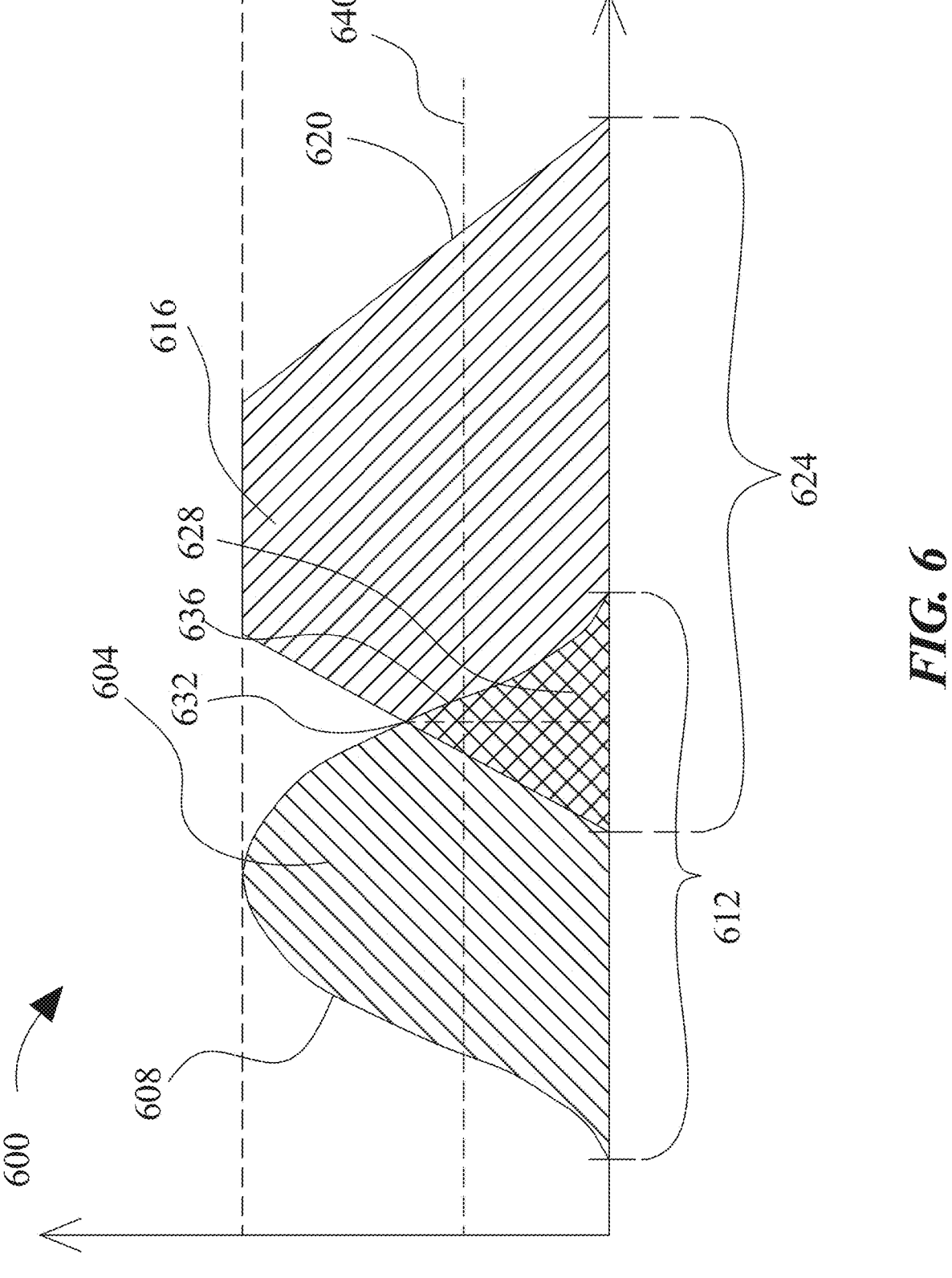
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \dfrac{x - a}{b - a}, & \text{for } a \leq x < b \\ \dfrac{c - x}{c - b}, & \text{if } b < x \leq c \end{cases}$$

a trapezoidal membership function may be defined as:

$$y(x, a, b, c, d) = \max\left(\min\left(\frac{x - a}{b - a}, 1, \frac{d - x}{d - c}\right), 0\right)$$

a sigmoidal function may be defined as:

$$y(x, a, c) = \frac{1}{1 - e^{-a(x - c)}}$$

a Gaussian membership function may be defined as:

$$y(x, c, \sigma) = e^{-\frac{1}{2}\left(\frac{x - c}{\sigma}\right)^2}$$

and a bell membership function may be defined as:

$$y(x, a, b, c,) = \left[1 + \left|\frac{x - c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, user profile, and a predetermined class, such as without limitation of vehicle care command. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or user profile and a predetermined class, such as without limitation vehicle care command categorization, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify a user profile with vehicle care command. For instance, if a vehicle care command has a fuzzy set matching user profile fuzzy set by having a degree of overlap exceeding a threshold, processor 116 may classify the user profile as belonging to the vehicle care command categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a user profile may be compared to multiple vehicle care command categorization fuzzy sets. For instance, user profile may be represented by a fuzzy set that is compared to each of the multiple vehicle care command categorization fuzzy sets; and a degree of overlap exceeding a threshold between the user profile fuzzy set and any of the multiple vehicle care command categorization fuzzy sets may cause processor 116 to classify the user profile as belonging to vehicle care command categorization. For instance, in one embodiment there may be two vehicle care command categorization fuzzy sets, representing respectively vehicle care command categorization and a vehicle care command categorization. First vehicle care command categorization may have a first fuzzy set; Second vehicle care command categorization may have a second fuzzy set; and user profile may have a user profile fuzzy set. processor 116, for example, may compare a user profile fuzzy set with each of vehicle care command categorization fuzzy set and in vehicle care command categorization fuzzy set, as described above, and classify a user profile to either, both, or neither of vehicle care command categorization or in vehicle care command categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, user profile may be used indirectly to determine a fuzzy set, as user profile fuzzy set may be derived from outputs of one or more machine-learning models that take the user profile directly or indirectly as inputs.

Still referring to FIG. 6, a computing device may use a logic comparison program, such as, but not limited to, a fuzzy logic model to determine a vehicle care command response. An vehicle care command response may include, but is not limited to, amateur, average, knowledgeable, superior, and the like; each such vehicle care command response may be represented as a value for a linguistic variable representing vehicle care command response or in other words a fuzzy set as described above that corresponds to a degree of match of user profile as calculated using any statistical, machine-learning, or other method that may occur to a person skilled in the art upon reviewing the entirety of this disclosure. In other words, a given element of user profile may have a first non-zero value for membership in a first linguistic variable value and a second non-zero value for membership in a second linguistic variable value. In some embodiments, determining a vehicle care command categorization may include using a linear regression model. A linear regression model may include a machine learning model. A linear regression model may be configured to map data of user profile, such as degree of match of user profile to one or more vehicle care command parameters. A linear regression model may be trained using a machine learning process. A linear regression model may map statistics such as, but not limited to, quality of user profile match of user profile. In some embodiments, determining a vehicle care command of user profile may include using a vehicle care command classification model. A vehicle care command classification model may be configured to input collected data and cluster data to a centroid based on, but not limited to, frequency of appearance, linguistic indicators of quality, and the like. Centroids may include scores assigned to them such that quality of match of user profile of user profile may each be assigned a score. In some embodiments vehicle care command classification model may include a K-means clustering model. In some embodiments, vehicle care command classification model may include a particle swarm optimization model. In some embodiments, determining the vehicle care command of a user profile may include using a fuzzy inference engine. A fuzzy inference engine may be configured to map one or more user profile data elements using fuzzy logic. In some embodiments, user profile may be arranged by a logic comparison program into vehicle care command arrangement. A "vehicle care command arrangement" as used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to user profile, such as a degree of match of user profile, while a second membership function may indicate a degree of in vehicle care command of a subject thereof, or another measurable value pertaining to user profile. Continuing the example, an output linguistic variable may represent, without limitation, a score value. An inference engine may combine rules, such as: "if the last service is 'car wash' and the service frequency is 'high', the vehicle care parameter of the vehicle care command is 'car wash"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T (a, b)=T (b, a)), monotonicity: (T (a, b)$\leq$T (c, d) if a$\leq$c and b$\leq$d), (associativity: T (a, T (b, c))=T (T (a, b), c)), and the requirement that the number 1 acts as an identity element. Combinations of rules ("and" or "or" combination of rule membership determinations) may be performed using any T-conorm, as represented by an inverted T symbol or "⊥" such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Now referring to FIG. 7, a flow diagram of an exemplary embodiment of a method 700 for providing a dynamic user experience in a vehicle care is illustrated. Method 700 includes a step 705 of accepting, by at least a processor of a control module configured to operate a plurality of vehicle care devices, a user profile pertaining to a user from a user device, wherein the user profile includes a vehicle profile. In some embodiments, accepting user profile may include retrieving the user profile by scanning the at least a token via a token scanner device connected to the control module. This may be implemented, without limitation, with reference to FIGS. 1-6.

With continued reference to FIG. 7, method 700 includes a step 710 of generating, by the at least a processor of the control module, at least a token as a function of the user profile. In some embodiments, generating the at least a token may include linking a QR code to the at least a token as a function of the user profile. In some embodiments, generating at least a token may include enabling a Near Field Communication (NFC) setting on the user device as a function of the user profile. This may be implemented, without limitation, with reference to FIGS. 1-6.

With continued reference to FIG. 7, method 700 includes a step 715 of creating, by the at least a processor of the control module, a visual interface as a function of the user profile. In some embodiments, creating the visual interface may include transmitting the visual interface to the user device, wherein the visual interface may be configured to display the at least a token. This may be implemented, without limitation, with reference to FIGS. 1-6.

With continued reference to FIG. 7, method 700 includes a step 720 of determining, by the at least a processor of the control module, at least a vehicle care command as a function of the user profile, wherein determining at least a vehicle care command includes validating the at least a token as a function of the user profile. In some embodiments, determining the at least a vehicle care command may include receiving the at least a vehicle care command from the user via the visual interface. In some embodiments, the at least a vehicle care command comprises at least a vehicle care parameters. In some embodiments, determining the at least a vehicle care command may include training a vehicle care machine learning model using vehicle care training data, wherein the vehicle care training data includes a plurality of user profiles as input correlated to a plurality of vehicle care parameters as output, determining the at least one vehicle care parameter as a function of the user profile using the trained vehicle care machine learning model, and determining the at least one vehicle care command as a function of the at least one vehicle care parameter. In some embodiments, validating the at least a token may include utilizing a verification module configured to generate a verification datum as a function of the user profile. This may be implemented, without limitation, with reference to FIGS. 1-6.

With continued reference to FIG. 7, method 700 includes a step 725 of transmitting, by the at least a processor of the control module, the at least a vehicle care command to the plurality of vehicle care devices. In some embodiments, transmitting the at least a vehicle care command may include activating at least a vehicle care device of the plurality of vehicle care devices to perform at least a vehicle care as a function of the at least a vehicle care command. This may be implemented, without limitation, with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
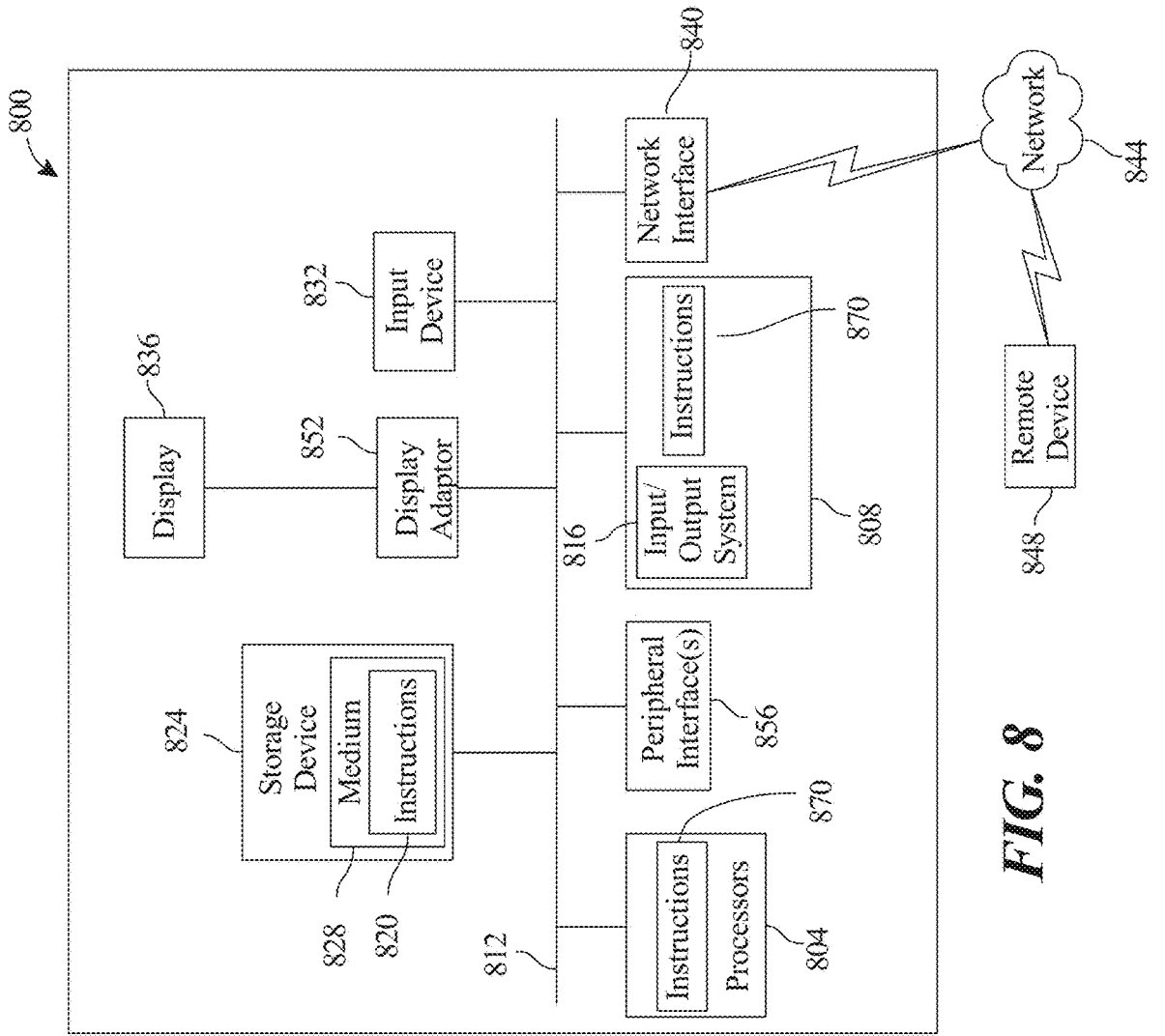
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing dynamic user experience in a vehicle care, the system comprises:

a plurality of vehicle care devices;

a control module configured to operate the plurality of vehicle care devices, wherein the control module comprises:

at least a processor; and a memory communicatively connected to the at least a processor, wherein the memory containing instructions configuring the at least a processor to:

accept, from a user device, a user profile pertaining to a user, wherein the user profile comprises one or more user preferences, wherein the user profile further comprises a vehicle profile comprising information pertaining to a vehicle of the user, wherein the information comprises a determination of a location of damage to the vehicle;

generate, using a smart contract, at least a token as a function of the user profile, wherein the at least a token comprises at least an access token, wherein the access token grants the user a temporary and revocable authorization to access specific features within a vehicle care site of a plurality of vehicle care sites and the access token comprises at least one access level, wherein the smart contract comprises one or more rules configured to process an input operable to trigger one or more actions for execution by the control module, wherein the one or more rules comprise a rule associated with at least one of:

granting a permission, transferring the at least a token, and transferring at least partial ownership of the at least a token, and wherein the one or more rules are configured to be executable based on the at least one access level;

determining at least one vehicle care command as a function of the user profile wherein determining at least a vehicle care command comprises:

validating the at least a token as a function of the user profile;

training a vehicle care machine learning model using vehicle care training data, wherein the vehicle care training data comprises:

a plurality of example vehicle profiles as inputs correlated to a plurality of example vehicle care parameters as outputs; and previous iterations of vehicle care commands;

determining at least one vehicle care parameter as a function of the user profile using the trained vehicle care machine learning model, wherein the at least one vehicle care parameter comprises proper vehicle care as a function of the determined damage to the vehicle; and determining the at least one vehicle care command as a function of the at least one vehicle care parameter; and transmitting the at least a vehicle care command to the plurality of vehicle care devices wherein transmitting the at least a vehicle care command comprises:

activating at least a vehicle care device of the plurality of vehicle care devices to perform at least a vehicle care as a function of the at least a vehicle care command.

2. The system of claim 1, wherein accepting the user profile comprises:

retrieving the user profile by scanning the at least a token that comprises the user profile and preferences via a token scanner device connected to the control module.

3. The system of claim 1, wherein generating the at least a token comprises linking a QR code to the at least a token as a function of the user profile.

4. The system of claim 1, wherein generating at least a token comprises enabling a Near Field Communication (NFC) setting on the user device as a function of the user profile.

5. The system of claim 1, wherein the processor is further configured to:

transmit a visual interface to the user device, wherein the visual interface is configured to display the at least a token.

6. The system of claim 1, wherein determining the at least a vehicle care command comprises receiving the at least a vehicle care command from the user via a visual interface.

7. The system of claim 1, wherein the at least a vehicle care command comprises at least a vehicle care parameter.

8. The system of claim 1, wherein validating the at least a token comprises:

utilizing a verification module configured to generate a verification datum as a function of the user profile.

9. The system of claim 1, wherein the at least one vehicle care parameter further comprises an operation setting.

10. The system of claim 9, wherein the operation setting comprises a water pressure.

11. The system of claim 1, wherein the at least one vehicle care parameter further comprises a particular vehicle care location, wherein the particular vehicle care location comprises at least one of:

a location of a nearest vehicle care site of the plurality of vehicle care sites; and a location of a vehicle care site of the plurality of vehicle care sites with a highest customer review.

12. A method for providing dynamic user experience in a vehicle care, the method comprises:

accepting, from a user device, by at least a processor of a control module configured to operate a plurality of vehicle care devices, a user profile pertaining to a user, wherein the user profile comprises one or more user preferences, wherein the user profile further comprises a vehicle profile comprising information pertaining to a vehicle of the user, wherein the information comprises a determination of a location of damage to the vehicle;

generating, using a smart contract and by the at least a processor of the control module, at least a token as a function of the user profile, wherein the at least a token comprises at least an access token, wherein the access token grants the user a temporary and revocable authorization to access specific features within a vehicle care site of a plurality of vehicle care sites and the access token comprises at least one access level, wherein the smart contract comprises one or more rules configured to process an input operable to trigger one or more actions for execution by the control module, wherein the one or more rules comprise a rule associated with at least one of:

granting a permission, transferring the at least a token, and transferring at least partial ownership of the at least a token, and wherein the one or more rules are configured to be executable based on the at least one access level;

determining, by the at least a processor of the control module, at least one vehicle care command as a function of the user profile, wherein determining at least a vehicle care command comprises:

validating the at least a token as a function of the user profile;

training a vehicle care machine learning model using vehicle care training data, wherein the vehicle care training data comprises:

a plurality of example vehicle profiles as inputs correlated to a plurality of example vehicle care parameters as outputs; and previous iterations of vehicle care commands;

determining at least one vehicle care parameter as a function of the user profile using the trained vehicle care machine learning model, wherein the at least one vehicle care parameter comprises proper vehicle care as a function of the determined damage to the vehicle; and determining the at least one vehicle care command as a function of the at least one vehicle care parameter; and transmitting, by the at least a processor of the control module, the at least a vehicle care command to the plurality of vehicle care devices wherein transmitting the at least a vehicle care command comprises:

activating at least a vehicle care device of the plurality of vehicle care devices to perform at least a vehicle care as a function of the at least a vehicle care command.

13. The method of claim 12, wherein accepting the user profile comprises:

retrieving the user profile by scanning the at least a token that comprises the user profile and preferences via a token scanner device connected to the control module.

14. The method of claim 12, wherein generating the at least a token comprises linking a QR code to the at least a token as a function of the user profile.

15. The method of claim 12, wherein generating at least a token comprises enabling a Near Field Communication (NFC) setting on the user device as a function of the user profile.

16. The method of claim 12, further comprising:

Transmitting, by the at least a processor, a visual interface to the user device, wherein the visual interface is configured to display the at least a token.

17. The method of claim 12, wherein determining the at least a vehicle care command comprises receiving the at least a vehicle care command from the user via a visual interface.

18. The method of claim 12, wherein the at least a vehicle care command comprises at least a vehicle care parameter.

19. The method of claim 12, wherein validating the at least a token comprises:

utilizing a verification module configured to generate a verification datum as a function of the user profile.

20. The method of claim 12, wherein the at least one vehicle care parameter further comprises an operation setting.

21. The method of claim 20, wherein the operation setting comprises a water pressure.

22. The method of claim 12, wherein the at least one vehicle care parameter further comprises a particular vehicle care location, wherein the particular vehicle care location comprises at least one of:

a location of a nearest vehicle care site of the plurality of vehicle care sites; and a location of a vehicle care site of the plurality of vehicle care sites with a highest customer review.

* * * * *